April 8, 1958  L. L. ASPELIN  2,829,805
APPARATUS FOR DELIVERING LIQUID FROM AN AIRCRAFT
FUEL CELL UNDER ALL FLIGHT CONDITIONS
Filed June 14, 1955  3 Sheets-Sheet 3
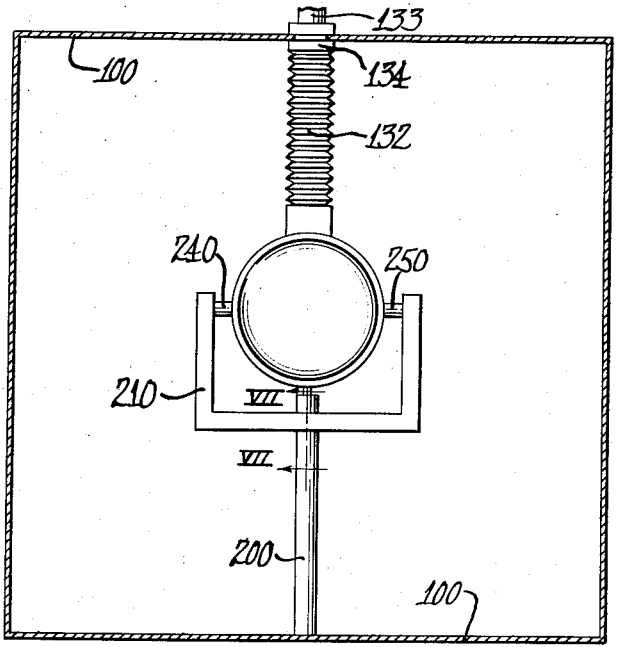
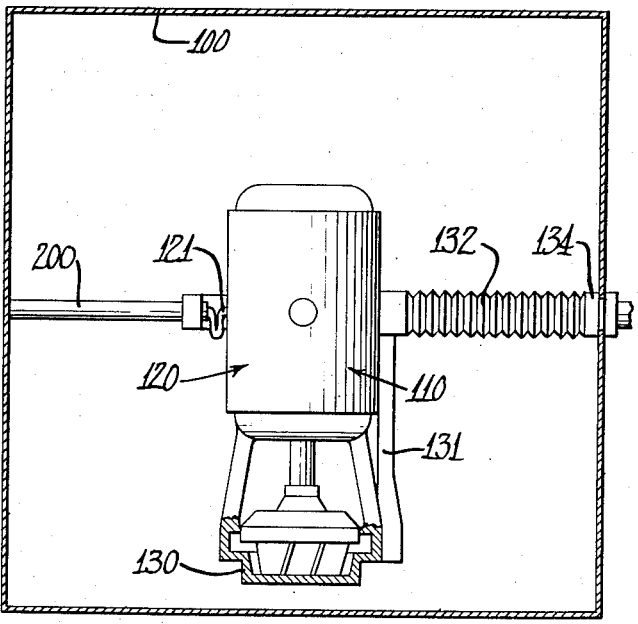
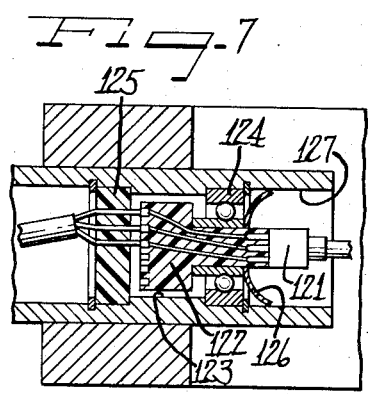
Inventor
Leslie L. Aspelin

United States Patent Office

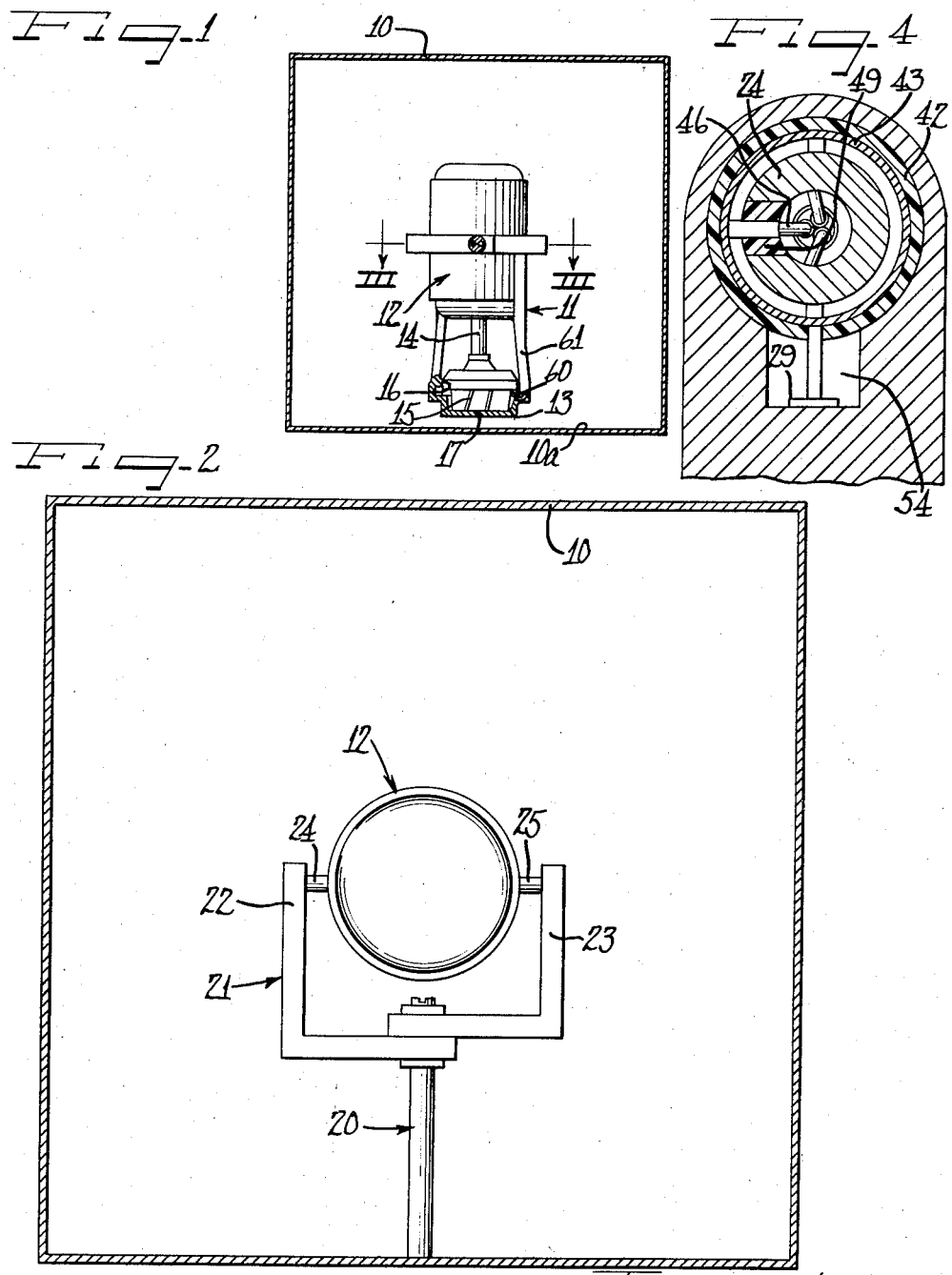

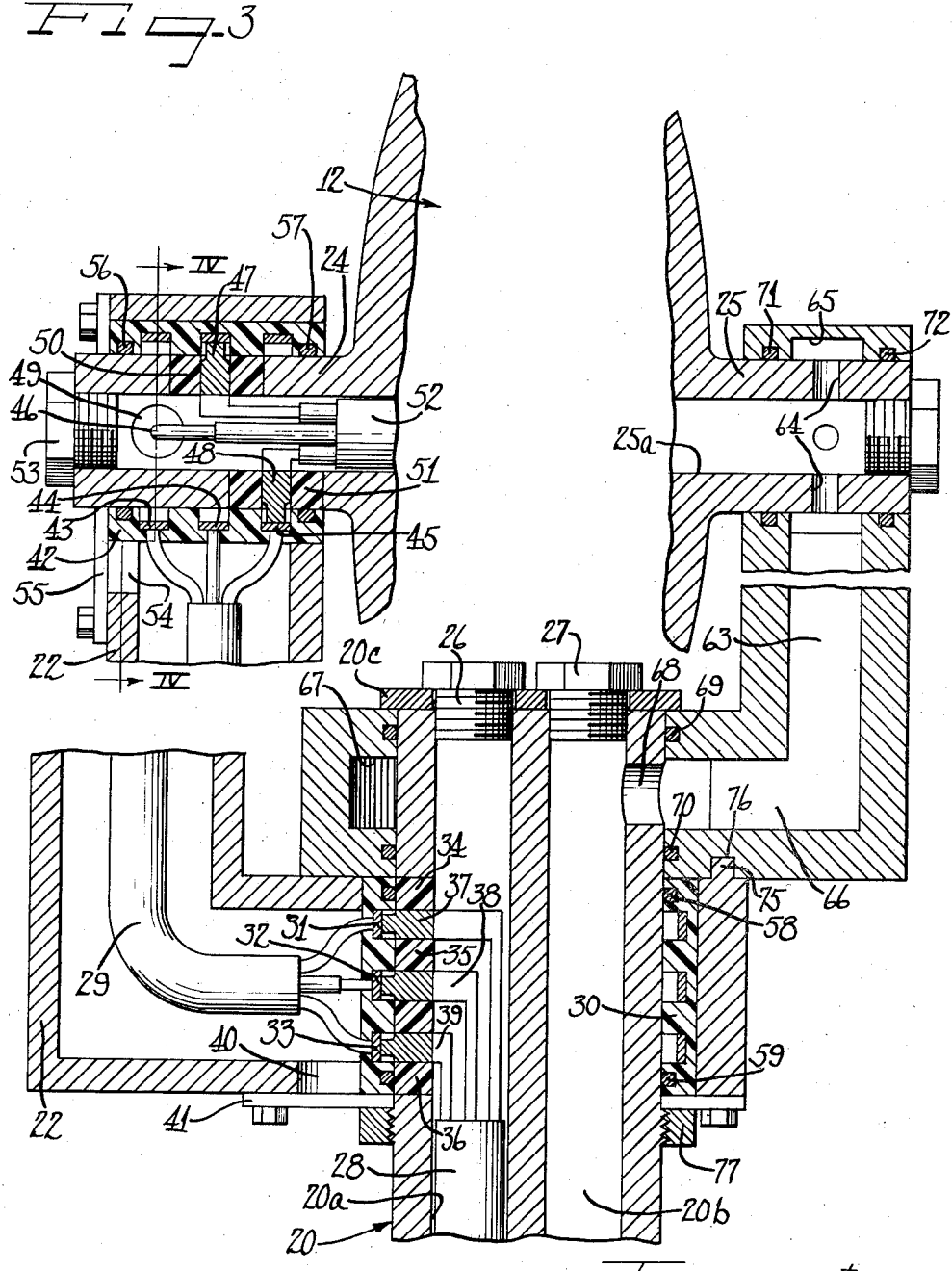

2,829,805
Patented Apr. 8, 1958

2,829,805

APPARATUS FOR DELIVERING LIQUID FROM AN AIRCRAFT FUEL CELL UNDER ALL FLIGHT CONDITIONS

Leslie L. Aspelin, Cleveland Heights, Ohio, assignor to Thompson Products, Inc., a corporation of Ohio Application June 14, 1955, Serial No. 515,440

10 Claims. (Cl. 222—333)

The present invention relates to the delivery of liquid from a tank in an aircraft or like device, under all conditions of flight of the aircraft and irrespective of the position of the liquid in the tank. More particularly, the invention is concerned with apparatus for pumping vapor free liquid fuel from an aircraft fuel cell in an uninterrupted stream under all flying conditions, including such abnormal flying conditions as negative gravity diving conditions, inverted flight conditions or the like.

As those skilled in the art are aware, modern aircraft, and particularly those used in military service must be capable of operation in an inverted condition as well as the upright condition and must also be capable of operation in dive conditions or the like in which the aircraft is approaching the earth at a rate greater than that induced by gravitational pull. Under such abnormal flight conditions, fuel or, for that matter, any other liquid carried in a cell or tank in the aircraft will be displaced into various positions within the cell, depending upon the forces of acceleration and gravity to the fuel. Accordingly, it is imperative that pumping apparatus be provided in such cells or tanks capable of delivering the fuel at all times independently of the position of the fuel within the cell. Various types of apparatus have heretofore been proposed for accomplishing this function, and among the United States patents issued dealing with this problem is my own prior Patent No. 2,547,246, issued April 3, 1951.

The prior art structures heretofore known, however, have accomplished the necessary functions through the use of plural pumps advantageously located at the various remote portions of the fuel cell and interrelated in operation to provide continuous flow of vapor-free fuel. However, the interconnection of such pumps is costly and somewhat intricate where sufficient pumps are to be utilized to assure completely successful operation in all conditions of fuel cell tilt. Accordingly, the apparatus of the present invention is an improved structure for assuring the successful emptying of fuel cells or the like under any and all flight conditions.

In accordance with the principles of the present invention, a single pump is provided. This pump is driven by means of a motor which is preferably electrical but which may, of course, comprise other types of known motors such as for example high speed hydraulic motors. The motor housing is pivotally mounted at a central point within the fuel cell in a universal manner such that the motor is free to rotate in a universal manner about that point. A vapor free fuel pump is rigidly associated with the motor housing and contains a fuel inlet remote from the housing pivot and adjacent the inner surface of the cell, and contains a fuel outlet universally associated with an outlet in the wall of the fuel cell whereby fuel is discharged from the pump independently of the pump's position. Energy for the rotation of the motor and hence operation of the pump is likewise introduced into the motor housing through a universal connection.

By positioning of the center of gravity of the combined pump and motor housing at a point remote from the pivotal axis of the unit, the pump operates substantially as a universally pivoted pendulum constantly submerged in liquid. This is true since, in conditions in which the fuel cell is only partially full, the liquid will position itself in accordance with gravity and inertia conditions in substantially the same manner as the center of gravity of the pump and motor unit. Accordingly, the pump and motor unit will move about with the fuel in the cell and the pump inlet will be constantly submerged at all times.

It is, therefore, an object of the present invention to provide an apparatus for delivering fuel from an aircraft fuel cell under all flight conditions by pumping the liquid from a submerged pump located within the body of liquid in the cell under all conditions of flight.

Another object of the invention is to provide an improved, universally mounted fuel cell pump.

A still further object of the present invention is to provide improved apparatus for assuring a supply of vapor-free, pressurized fuel to an aircraft engine during negative gravity flight conditions by means of a pump pivotally positioned centrally of a fuel cell so that the pump inlet is submerged in, and will move with, the fuel as it is moved by forces of gravity and acceleration.

A feature of the present invention is the provision of a pivotally mounted fuel booster pump positioned within a fuel cell and having a center of gravity remote from the point of pivotal mounting so that the pump is subject to the same forces acting on the fuel and will, accordingly, move with the fuel to any position it may take in the fuel cell.

Yet another object of the present invention is to provide an improved fuel cell and fuel booster pump construction wherein fuel may be removed from substantially any portion of the fuel cell by means of a single fuel pump and motor unit.

Other and further objects of the present invention will become apparent to those skilled in the art from a consideration of the following more detailed description of the drawings which, by way of illustration only, illustrate two embodiments of the present invention and in which:

Figure 1 is a side elevational view illustrating the positioning of a booster pump and motor unit in an aircraft fuel cell or the like;

Figure 2 is a plan view of the motor and pump unit mounted as illustrated in Figure 1, in a fuel cell;

Figure 3 is a cross-sectional view taken through the motor and pump unit, taken along the line III—III of Figure 1 and illustrating details of construction of the mounting thereof;

Figure 4 is a cross-sectional view taken along the line IV—IV of Figure 3;

Figure 5 is a plan view of a modified from of the apparatus constructed according to the present invention;

Figure 6 is a side elevational view of the pump and motor apparatus shown in Figure 5; and Figure 7 is a cross-sectional view taken along the line VII—VII of Figure 5 and illustrating the pivotal power connection utilized for the operation of the pump motor therein.

As shown on the drawings:

As may be seen from consideration of Figures 1 through 4, a fuel cell 10 is provided having a combined pump and motor unit 11 composed of a motor 12 and a pump 13 driven by the output shaft 14 of the motor. Preferably, the motor 12 is electrically driven and may be of substantially any enclosed type. The pump 13 comprises a vapor separating type impeller 15 mounted in a central chamber 16 having a bottom inlet opening 17. This impeller structure is now well known in the art and provides, when operating below the surface level of liquid fuel or the like, a vapor-free, pressurized output at a lateral opening in the chamber 16. It will be understood that the specific structure of the pump forms no part of the present invention and that substantially any commercially known pump impeller and housing structure may be utilized for purposes of the present invention as long as the pump inlet may satisfactorily be positioned adjacent the bottom wall 10a of the cell.

The combined motor and pump unit 11 is universally pivotally mounted within the cell 10 by means of a side support member 20. The support member 20 carries at its innermost end a fork 21 the arms 22 and 23 of which carry, respectively, trunnions 24 and 25 secured to the housing of the motor 12. The connections between the trunnions 24 and 25, and the respective arms 22 and 23 are freely pivotal and, likewise, the connection between the yoke member 21 and the support member 20 permits free rotation. It will be apparent, therefore, that the unit 11 may pivot freely into substantially any position within the cell 10 except the minimal portion of the cell occupied by the support member 20. Preferably, the support 20 projects laterally into the cell from a side wall thereof, rather than either a bottom, top, front or rear wall since fuel is least likely to assume a position on the side wall of the fuel tank and even if it did assume such position it would remain there only a short time.

Universally pivotal mounting of the unit 11 requires movable power connections for the motor and, likewise, a universally movable pump outlet. These are accomplished in accordance with the principles of the present invention in the manner shown in Figure 3. As there illustrated, the support member 20 is longitudinally bored with a pair of ducts 20a and 20b closed at their ends by threaded plugs 26 and 27 respectively. Since it is preferred that the motor 12 be electrical, an electrical conductor 28 is passed through the bore 20a and is connected to conductor 29 in the yoke arm 22 by means of a slip ring connection. As shown in Figure 3, three individual wires are illustrated for the control of the motor but it will be understood that the conduits 28 and 29 could comprise varying numbers of wires depending upon the type and control of the motor utilized. The electrical connection between the conduits 28 and 29 is made rotatable by means of provision of a ring carrying dielectric sleeve 30 having annular, recessed rings 31, 32 and 33. The support member 20 is laterally bored to provide for dielectric inserts 34, 35 and 36 which in turn carry spring pressed contacts 37, 38 and 39 for cooperation with the respective rings 31, 32 and 33. In assembly, the sleeve 30 may be inserted into the arm 22 laterally and the attached conductor 29 may be inserted first or passed through a slot 40 after the insertion of the sleeve 30. The slot 40 is covered by a cover plate 41 which provides a sealing engagement between the arm 22 and the support 20.

The conductor 29 is connected at its opposite end to a second dielectric sleeve 42 having recessed annular ring members 43, 44 and 45 which cooperate with spring pressed plungers 46, 47 and 48, respectively. The plungers 46, 47 and 48 are carried in radially directed lateral dielectric bushings 49, 50 and 51, respectively, carried by the trunnion 24 and connected to a motor conductor 52 leading to the internal motor connections of the motor 12. The trunnion 24 is closed at its external ends by means of the threaded plug 53 and as may be seen from a consideration of Figures 3 and 4, the assembly slot 54 which permits assembly of the sleeve 42 into the arm 22 is sealed by means of a cover plate 55, thereby providing a completely sealed pivotal connection.

Since it is necessary in installations of this type to prevent the possibility of an unshielded spark of any sort within the confines of the fuel cell, additional O-ring seals 56, 57, 58 and 59 are provided at the sleeves 42 and 30 to completely isolate the electrical contacts.

It will, of course, be understood that other types of pivotal electrical connections may be employed and that the structure illustrated is intended to be illustrative, only, of a satisfactory apparatus. It will be appreciated, however, that any connection incorporated must be capable of pivotal operation without sparking whether submerged in fuel or not.

Fuel from the outlet 60 of the pump is preferably carried through the conduit 61 integral with the housing of the unit 11 and serving simultaneous functions of supporting the pump housing fixedly relative to the motor 12 and delivering pressurized fuel to trunnion 25. The trunnion 25 is preferably welded integral with the housing of the motor 12 and is provided with a bore 25a forming an extension of the pump outlet conduit 61. As may be seen from Figure 3, the bore 25a is connected to a bore 63 in arm 23 by means of radial bores 64 in the trunnion 25 and annular recess 65 in the arm 23.

Pressurized fuel flows from the bore 63 to bore 66 and from thence into bore 20b by means of a second rotatable fluid connection formed by annular recess 67, in the arm 23 and a lateral bore 68 in the support 20. O-ring seals 69, 70, 71 and 72 are provided at the support 20 and the trunnion 25 to prevent leakage.

The arms 22 and 23 may, of course, be constructed as an integral casting. However, as illustrated, they are shown constructed separately and keyed together for simultaneous rotation about the support 20, by means of a key 75 projecting into a recess 76 in the arm 23. The arms 22 and 23 are maintained against separation, and on the support 20 by means of the support plate 20c and a retainer collar 77. The support 20 is rigidly secured to the wall of the fuel cell, and to the frame structure of the aircraft in any conventional manner. From the above, it will be apparent that the pump and motor unit of the present invention is pivotally mounted in a universal manner and that the energy required to operate the motor 12 is introduced to the motor through a universal connection. Likewise, pressurized fuel from the pump 13 leaves the fuel cell through a universal connection. The universal connections for the motor energy source and the fuel output are, as illustrated in Figures 1 through 4, constructed in such a way as to prevent any interference whatever with the free swinging movement of the pump unit which is, accordingly, permitted to swing at will in response to gravitational, acceleration, or other forces acting upon the center of gravity of the unit 11. In practice, the unit 11 may be suspended about a point approximately at the mid point of the motor 12, thereby providing a center of gravity somewhere between the point of pivotal movement and the pump 13.

In the modified form of the invention illustrated in Figures 5, 6 and 7, a combined pump and motor unit 110, comprising a motor 120 and a vapor-free booster pump 130, is universally mounted to a support 200 by means of yoke 210 and trunnions 240 and 250. In the form shown in Figures 5 through 7, however, the pivotal connections between the trunnions 240, 250 and the yoke 210, as well as the pivotal connection between the yoke 210 and the support 200 do not contain means for transferring electrical energy or fuel. Instead, electrical energy is introduced to the motor 120 by means of a flexible conductor 121 connected to a slip ring carrying member 122 which is in turn rotatably mounted within a bore 123 in the support member 200. As illustrated in Figure 7, the slip ring carrying member 122 is mounted in a ball bearing 124 for rotation with the conductor 121.

The bore 123 carries a dielectric contactor disk 125 carrying contacts spring biased into cooperative engagement with the slip rings of the member 122. The electrical contact between the contacts in the dielectric body 125 and member 122 thus permits rotation of the conductor 121 with the motor 120 about the longitudinal axis of the support 200. A seal 126, carried by the member 122 and operating against the inner wall 127 of the member 200, prevents the possibility of a spark igniting the fuel in the cell 100.

As may be seen from a consideration of Figure 6, the conductor 121 is sufficiently long to permit rotation of the motor 120 about the trunnions 240 and 250 independently of the angle of the motor 120 relative to the support 200. Thus, by a single pivotal connection, universal energy input is provided to the motor 120.

Pressurized fuel from the pump 130 is taken through the conduit 131 to an extensible, flexible, conduit connector 132 which is in turn connected to a conduit 133 at the fuel cell wall by means of any conventional rotatable fluid connection 134. Such connections are well known in the coupling art and hence a connection is shown only diagrammatically in Figures 5 and 6. In view of the extensibility of the coupling conduit 132, the unit 120 may have substantially complete freedom of movement throughout the fuel cell 100 while utilizing only a single rotatable connection 134.

In the modifications shown in Figures 5, 6 and 7, only two rotatable connections are necessary and, accordingly, the resultant structure is somewhat less expensive than that shown in Figures 1 through 4. However, in view of the presence of the open conductor 121 and the conduit 132 in the cell, slightly less freedom of movement is available to the motor unit 110, generally. In some installations, however, the reduction in expense may warrant utilization of the arrangement illustrated in Figures 5, 6 and 7.

It will be understood, also, that the instant invention contemplates as within its scope, the universal pivotal mounting of the pump 13 or 130 as illustrated but with the drive for the pump being supplied through a flexible shaft entering through the wall of the fuel cell, thus permitting the motor to be mounted externally thereof.

It will be understood, of course, that in place of the electrical motor illustrated, a hydraulic, high speed motor may be used. In that event, a pair of hydraulic lines may be substituted for the three wire electrical conductor system by means of pivotal fluid connections of the type illustrated in connection with the pivotal fuel connections shown in Figures 1 through 3. Such a system would, of course, obviate the danger of spark ignition of the fuel. In such a hydraulic system, it will, of course, be apparent that either pressurized gas or liquid may be utilized.

It will thus be understood that I have provided an improved apparatus for delivering pressurized liquid fuel from a container independently of the position of tilt of the container. Since it will be apparent to those skilled in the art that variations and modifications may be made in the structures illustrated without departing from the scope of the novel concepts of the present invention, it is my intention that the scope of the present invention be limited solely by that of the hereinafter appended claims.

I claim as my invention:

1. In combination with a tiltable liquid carrying container, a pump having a pump inlet positioned adjacent the inner surface of the container and an outlet, means universally pivotally supporting said pump in said container about a point generally centrally thereof, means universally drivingly connected to said pump for operation thereof and means universally connecting said pump outlet to a point externally of said container, said last two means permitting universal pivotal movement of said pump within said container and the center of gravity of said pump being located between said point and said inlet whereby said inlet is substantially constantly positioned below the surface of the liquid within said container independently of the tilted condition of the latter.

2. In combination with a tiltable liquid carrying container, a pump having a pump inlet positioned adjacent the inner surface of the container and an outlet secured to the housing thereof, a motor, means connecting said motor and pump for movement as a unit, second means universally pivotally supporting said unit in said container about a point generally centrally located therein, third means for energizing said motor and fourth means connecting said pump outlet to a fuel line fixed relative to said container, said third and fourth means comprising universal connections providing universal pivotal movement of said unit within said container and the center of gravity of said pump being located between said point and said inlet whereby said inlet is substantially constantly positioned under the surface of the liquid in said container independently of the tilted position of the latter.

3. In combination with a tiltable liquid carrying container, a pump having a pump inlet positioned adjacent the inner surface of the container and an outlet secured to the housing thereof, a motor, means connecting said motor and pump for movement as a unit, second means universally pivotally supporting said unit in said container about a point generally centrally located therein, third means for energizing said motor and fourth means connecting said pump outlet to a fuel line fixed relative to said container, said third and fourth means passing through said second means and permitting universal pivotal movement of said pump within said container and the center of gravity of said pump being located between said point and said inlet whereby said inlet is substantially constantly positioned under the surface of the liquid in said container independently of the tilted position of the latter.

4. In combination with a tiltable liquid carrying container, a pump having a pump inlet positioned adjacent the inner surface of the container and an outlet secured to the housing thereof, a motor, means connecting said motor and pump for movement as a unit, second means universally pivotally supporting said unit in said container about a point generally centrally located therein, third means for energizing said motor and fourth means connecting said pump outlet to a fuel line fixed relative to said container, at least said third means passing through said second means, and said third and fourth means permitting universal pivotal movement of said pump within said container and the center of gravity of said pump being located between said point and said inlet whereby said inlet is substantially constantly positioned under the surface of the liquid in said container independently of the tilted position of the latter.

5. In combination with a tiltable liquid carrying container, a pump having a pump inlet positioned adjacent the inner surface of the container and an outlet secured to the housing thereof, a motor, means connecting said motor and pump for movement as a unit, second means universally pivotally supporting said unit in said container about a point generally centrally located therein, third means for energizing said motor and fourth means connecting said pump outlet to a fuel line fixed relative to said container, said third and fourth means comprising universally pivotal connections forming a part of said second means and permitting universal pivotal movement of said unit within said container and the center of gravity of said pump being located between said point and said inlet whereby said inlet is substantially constantly positioned under the surface of the liquid in said container independently of the tilted position of the latter.

6. In combination with a tiltable liquid carrying container, a pump having a pump inlet positioned adjacent the inner surface of the container and an outlet secured to the housing thereof, a motor, means connecting said motor and pump for movement as a unit, second means universally pivotally supporting said unit in said container about a point generally centrally located therein, third means for energizing said motor and fourth means connecting said pump outlet to a fuel line fixed relative to said container, said second means comprising a yoke member pivotally supporting said unit by a pair of trunnions on the latter and in turn pivotally supported relative to said container, said third and fourth means permitting universal pivotal movement of said unit within said container and the center of gravity of said pump being located between said point and said inlet whereby said inlet is substantially constantly positioned under the surface of the liquid in said container independently of the tilted position of the latter.

7. In combination with a tiltable liquid carrying container, a pump having a pump inlet positioned adjacent the inner surface of the container and an outlet secured to the housing thereof, a motor, means connecting said motor and pump for movement as a unit, second means universally pivotally supporting said unit in said container about a point generally centrally located therein, third means for energizing said motor and fourth means connecting said pump outlet to a fuel line fixed relative to said container, said third and fourth means having portions thereof passed through said second means and permitting universal pivotal movement of said unit within said container and the center of gravity of said pump being located between said point and said inlet whereby said inlet is substantially constantly positioned under the surface of the liquid in said container independently of the tilted position of the latter.

8. In combination with a tiltable liquid carrying container, a pump having a pump inlet positioned adjacent the inner surface of the container and an outlet secured to the housing thereof, a motor, means connecting said motor and pump for movement as a unit, second means universally pivotally supporting said unit in said container about a point generally centrally located therein, third means for energizing said motor and fourth means connecting said pump outlet to a fuel line fixed relative to said container, at least said third means having a portion thereof passing through said second means, said third and fourth means permitting universal pivotal movement of said unit within said container and the center of gravity of said pump being located between said point and said inlet whereby said inlet is substantially constantly positioned under the surface of the liquid in said container independently of the tilted position of the latter.

9. In combination with a tiltable liquid carrying container, a pump having a pump inlet positioned adjacent the inner surface of the container and an outlet secured to the housing thereof, a motor, means connecting said motor and pump for movement as a unit, second means universally pivotally supporting said unit in said container about a point generally centrally located therein, third means for energizing said motor and fourth means connecting said pump outlet to a fuel line fixed relative to said container, said third and fourth means each being universally pivotal relative to said container and of sufficient operable length to permit universally pivotal movement of said unit within said container independently of the tilted position of the latter.

10. In combination with a tiltable liquid carrying container, a pump having a pump inlet positioned adjacent the inner surface of the container and an outlet secured to the pump housing, means universally pivotally supporting said pump in said container about a point generally centrally thereof and with the pump inlet and the pump center of gravity positioned eccentrically of the pivotal support, means for driving said pump, and means universally connecting said pump outlet to a fuel line fixed relative to said container, said eccentric positioning of said center of gravity operating upon changes in force on said container to cause pivotal movement of said pump within said container such that said inlet is substantially constantly positioned below the surface of the liquid within said container independently of the tilted condition of the latter.

References Cited in the file of this patent
UNITED STATES PATENTS

| | | |
|---|---|---|
| 1,735,784 | Olson | Nov. 12, 1929 |
| 1,751,452 | Strietmann | Mar. 18, 1930 |
| 1,845,136 | Dieter | Feb. 16, 1932 |
| 2,792,158 | Veitch, Sr., et al. | May 14, 1957 |
| 2,792,192 | Wheeler | May 14, 1957 |